US012138982B2

(12) United States Patent  
Menden et al.

(10) Patent No.: US 12,138,982 B2
(45) Date of Patent: Nov. 12, 2024

(54) SUSPENSION CONTROLLER AND SENSOR NETWORK FOR RIDE HEIGHT CONTROL WITH AIR SUSPENSION

(71) Applicant: ARNOTT T&P HOLDING, LLC, Merritt Island, FL (US)

(72) Inventors: Bradley Menden, Merritt Island, FL (US); Ryan Rutledge, Merritt Island, FL (US)

(73) Assignee: ARNOTT T&P HOLDING, LLC, Merritt Island, FL (US)

( * ) Notice: Subject to any disclaimer, the term of this patent is extended or adjusted under 35 U.S.C. 154(b) by 241 days.

(21) Appl. No.: 17/482,168

(22) Filed: Sep. 22, 2021

(65) Prior Publication Data

US 2022/0088988 A1   Mar. 24, 2022

Related U.S. Application Data

(60) Provisional application No. 63/082,610, filed on Sep. 24, 2020.

(51) Int. Cl.
*B60G 17/019* (2006.01)
*B60G 17/015* (2006.01)
*B60G 21/08* (2006.01)

(52) U.S. Cl.
CPC ... *B60G 17/01908* (2013.01); *B60G 17/0155* (2013.01); *B60G 21/08* (2013.01); *B60G 2202/152* (2013.01); *B60G 2400/0516* (2013.01); *B60G 2401/28* (2013.01); *B60G 2800/7022* (2013.01); *B60G 2800/914* (2013.01)

(58) Field of Classification Search
CPC .......... B60G 17/01908; B60G 17/0155; B60G 21/08; B60G 2202/152; B60G 2400/0516; B60G 2401/28; B60G 2800/7022; B60G 2800/914
See application file for complete search history.

(56) References Cited

U.S. PATENT DOCUMENTS

2020/0047580 A1\* 2/2020 Coombs ............. B60G 17/0526
2021/0178847 A1\* 6/2021 Hein .................. B60G 17/0155

FOREIGN PATENT DOCUMENTS

WO   WO-2018033321 A1 \* 2/2018 ....... B60G 17/01908

OTHER PUBLICATIONS

Machine Translation of WO2018033321A1 PDF File Name: "WO2018033321A1_Machine_Translation.pdf".\*

\* cited by examiner

*Primary Examiner* — Grant Moubry
*Assistant Examiner* — Ruben Picon-Feliciano
(74) *Attorney, Agent, or Firm* — Barnes & Thornburg LLP; Mark J. Nahnsen

(57) ABSTRACT

A system for controlling vehicle ride height include a suspension controller. The suspension controller is coupled to a motion sensor attached to a chassis of a vehicle and additional motion sensors each attached to a suspension member of the vehicle that pivots relative to the chassis. The suspension controller receives motion sensor data from the motion sensors and determines relative angular position of each suspension member as a function of motion sensor data received from the motion sensor attached to the chassis and motion sensor data received from the motion sensor attached to the suspension member. The suspension controller adjusts an air suspension based on the relative angular position. Other embodiments are described and claimed.

12 Claims, 9 Drawing Sheets

SUSPENSION CONTROLLER AND SENSOR NETWORK FOR RIDE HEIGHT CONTROL WITH AIR SUSPENSION

PRIORITY CLAIM

This application claims priority under 35 U.S.C. § 119(e) to U.S. Provisional Application Ser. No. 63/082,610, filed Sep. 24, 2020, which is expressly incorporated herein by reference in its entirety.

BACKGROUND

Vehicles such as cars, sport utility vehicles (SUVs), and trucks may include an air suspensions. Typical vehicles with air suspensions include electromechanical ride height sensors. Such sensors may include a potentiometer with an arm or lever that is physically connected to a suspension component. In use, the potentiometer senses position of the arm as it moves with the suspension component, which indicates relative position of the suspension component, and may be used to determine suspension angle and/or ride height of the vehicle.

SUMMARY

According to one aspect of the disclosure, a suspension controller for controlling a vehicle air suspension includes a sensor interface, a suspension model, and a suspension manager. The sensor interface is to receive first motion sensor data from a first motion sensor, wherein the first motion sensor is attached to a chassis of a vehicle and receive second motion sensor data from a second motion sensor, wherein the second motion sensor is attached to a suspension member of the vehicle, and wherein the suspension member rotates or pivots relative to the chassis of the vehicle. The suspension model is to determine a relative angular position of the suspension member as a function of the first motion sensor data and the second motion sensor data. The suspension manager is to adjust an air suspension of the vehicle based on the relative angular position.

In an embodiment, each of the first motion sensor and the second motion sensor comprises an inertial measurement unit (IMU), and each of the first motion sensor data comprises accelerometer data, gyroscope data, or magnetometer data. In an embodiment, the sensor interface is further to receive motion sensor data from a third motion sensor, a fourth motion sensor, and a fifth motion sensor, wherein each of the second motion sensor, the third motion sensor, the fourth motion sensor, and the fifth motion sensor are attached to suspension members located at a different corner of the vehicle. In an embodiment, to adjust the air suspension comprises to control a ride height of the air suspension.

According to another aspect of the disclosure, a suspension controller for calibrating a vehicle air suspension includes a suspension manager, a sensor interface, and a calibration manager. The suspension manager is configured to control an air suspension of a vehicle to extend to a top of travel and control the air suspension to retract to a bottom of travel. The sensor interface is adapted to read a top of travel value from a first motion sensor coupled to a suspension member of the vehicle in response to control of the air suspension to extend to the top of travel, wherein the suspension member rotates or pivots relative to a chassis of the vehicle, and read a bottom of travel value from the first motion sensor in response to control of the air suspension to retract to the bottom of travel. The calibration manager is configured to determine a differential travel value as a function of the top of travel value and the bottom of travel value, and scale relative angular position data from the first motion sensor based on the differential travel value.

In an embodiment, the calibration manager is further configured to identify a most critical axis associated with the first motion sensor based on a difference between the top of travel value and the bottom of travel value for each axis. In an embodiment, the sensor interface is further configured to read a second top of travel value from a second motion sensor coupled to the chassis of the vehicle in response to the control of the air suspension to extend to the top of travel, and read a second bottom of travel value from the second motion sensor in response to the control of the air suspension to retract to the bottom of travel; and the calibration manager is further configured to determine whether a difference between the second top of travel value and the second bottom of travel data exceeds a predetermined acceptable maximum, and generate an error in response to a determination that the difference exceeds the acceptable maximum.

According to another aspect of the disclosure, a method for controlling a vehicle air suspension includes receiving, by a suspension controller, first motion sensor data from a first motion sensor, wherein the first motion sensor is attached to a chassis of a vehicle. The method further includes the step of receiving, by the suspension controller, second motion sensor data from a second motion sensor, wherein the second motion sensor is attached to a suspension member of the vehicle, wherein the suspension member rotates or pivots relative to the chassis of the vehicle. The method further includes the step of determining, by the suspension controller, a relative angular position of the suspension member as a function of the first motion sensor data and the second motion sensor data; and adjusting, by the suspension controller, an air suspension of the vehicle based on the relative angular position.

In an embodiment, each of the first motion sensor and the second motion sensor comprises an inertial measurement unit (IMU), and each of the first motion sensor data comprises accelerometer data, gyroscope data, or magnetometer data. In an embodiment, the method further includes receiving motion sensor data from a third motion sensor, a fourth motion sensor, and a fifth motion sensor, wherein each of the second motion sensor, the third motion sensor, the fourth motion sensor, and the fifth motion sensor are attached to suspension members located at a different corner of the vehicle. In an embodiment, adjusting the air suspension comprises controlling a ride height of the air suspension.

According to another aspect, a method for calibrating a vehicle air suspension includes controlling, by a suspension controller, an air suspension of a vehicle to extend to a top of travel; reading, by the suspension controller, a top of travel value from a first motion sensor coupled to a suspension member of the vehicle in response to controlling the air suspension to extend to the top of travel, wherein the suspension member rotates or pivots relative to a chassis of the vehicle. The method further requires controlling, by the suspension controller, the air suspension to retract to a bottom of travel and reading, by the suspension controller, a bottom of travel value from the first motion sensor in response to controlling the air suspension to retract to the bottom of travel. The method further requires the step of determining, by the suspension controller, a differential travel value as a function of the top of travel value and the bottom of travel value; and scaling, by the suspension controller, relative angular position data from the first motion sensor based on the differential travel value.

In an embodiment, the method further includes identifying a most critical axis associated with the first motion sensor based on a difference between the top of travel value and the bottom of travel value for each axis. In an embodiment, the method further includes reading, by the suspension controller, a second top of travel value from a second motion sensor coupled to the chassis of the vehicle in response to controlling the air suspension to extend to the top of travel; reading, by the suspension controller, a second bottom of travel value from the second motion sensor in response to controlling the air suspension to retract to the bottom of travel; determining, by the suspension controller, whether a difference between the second top of travel value and the second bottom of travel data exceeds a predetermined acceptable maximum; and generating, by the suspension controller, an error in response to determining that the difference exceeds the acceptable maximum.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
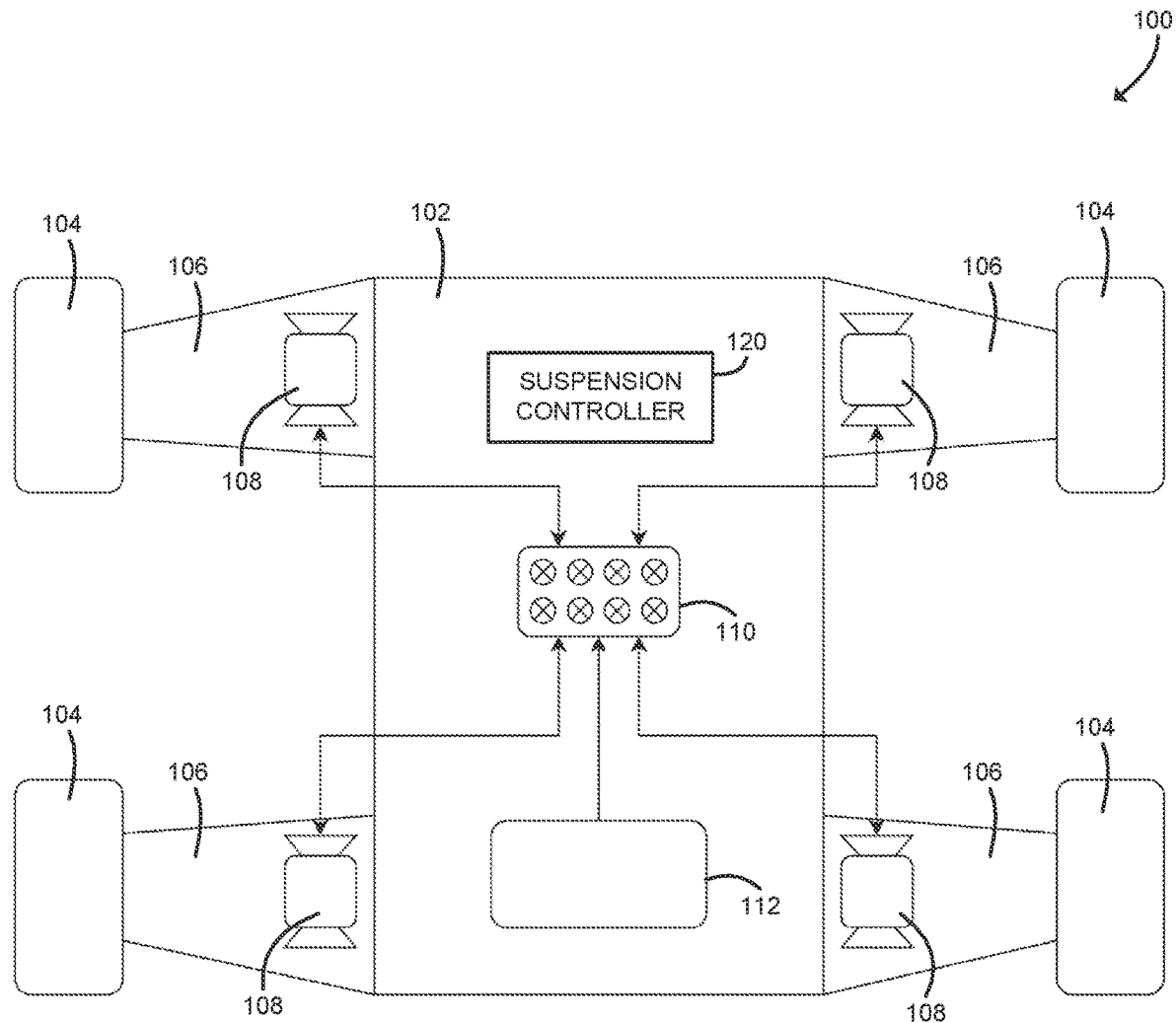
FIGS. 1-2 are simplified block diagrams of at least one embodiment of a vehicle with an air suspension system including a suspension controller and a sensor network.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative vehicle 100 includes a chassis 102 and four wheels 104. The vehicle 100 may be embodied as a car, a truck, an SUV, a light duty vehicle, a heavy duty vehicle, or other vehicle. Each wheel 104 is connected to the chassis 102 by one or more suspension members 106. Each suspension member 106 may be embodied as a control arm, a link, a strut, or other component of the vehicle suspension. Each of the suspension members 106 may pivot relative to the chassis 102.

The vehicle 100 further includes an air suspension including an air spring 108 coupled to each of the suspension members 106. Each air spring 108 changes in length in response to changes in the internal volume of air. Changes in length of the air spring 108 may change the distance between the body of the vehicle 102 and at least a portion of the suspension member 106 or otherwise adjust ride height of the vehicle 100. Each air spring 108 is coupled to a valve manifold 110, which is in turn coupled to an air supply system 112. The valve manifold 110 may include multiple solenoids or other electrically operable valves with common functionality to either allow air flow to increase the volume of one or more air springs 108 or allow air flow to decrease the volume of one or more air springs 108. The air supply system 112 is used to add a volume of air to one or more air springs 108 via the valve manifold 110, and may include various components such as a compressor and air reservoir, an air reservoir, or a compressor alone.

Figure 2:
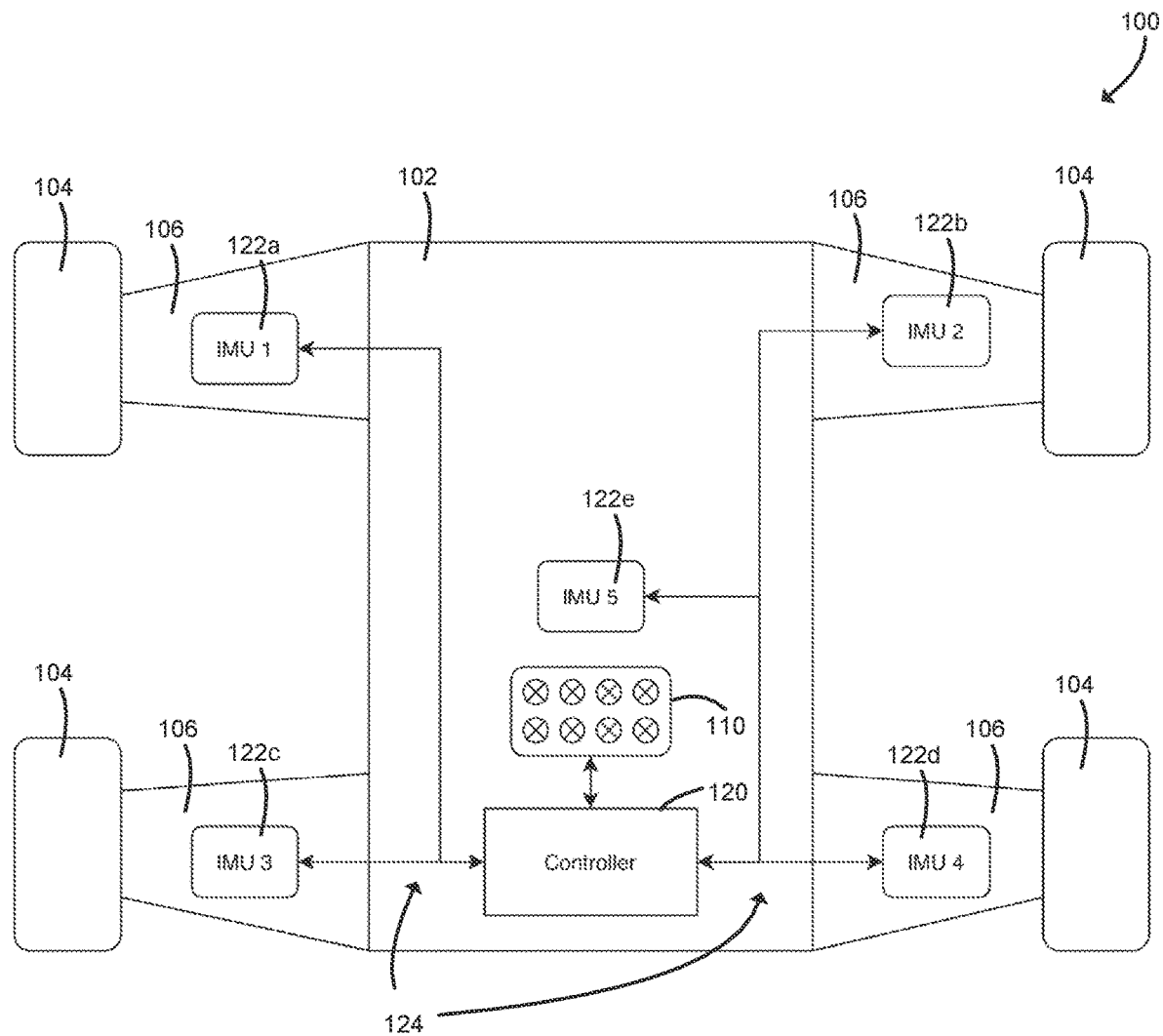

Referring now to FIGS. 1 and 2, the vehicle 100 further includes a suspension controller 120. The suspension controller 120 is coupled to the valve manifold 110 and is configured to control operation of one or more electrically operable valves in order to control the supply of air to the air springs 108. The suspension controller 120 is further coupled to one or more sensors 122, including five inertial measurement units (IMUs) 122*a* through 122*e*. The suspension controller 120 may be coupled to the IMUs 122 and/or other components via a vehicle network 124. In use, as described further below, the suspension controller 120 will actuate the one or more individual valves in the valve manifold 110 based on data provided from the IMUs 122 to achieve a specified distance from the chassis 102 to the suspension member (i.e., to achieve a specified ride height). This may include maintaining this distance over a period of time, changing between preset distances, achieve a preset distance, or other similar functions. Thus, the suspension controller 120 and sensor network described herein may measure ride height without the use of electromechanical sensors such as potentiometers. Accordingly, the sensor system described herein may have improved reliability, easier installation compared to previous systems that used electromechanical ride height sensors.

The suspension controller 120 may be embodied as an electronic control unit (ECU), a digital signal processor, a microcontroller, a microprocessor, a system-on-a-chip (SoC), or other control circuit and related electronics. Accordingly, the suspension controller 120 may include a number of electronic components commonly associated with units utilized in the control of electronic and electromechanical systems. For example, the suspension controller 120 may include, among other components customarily included in such devices, a processor, a memory device, and a data storage device. The processor may be any type of device capable of executing software or firmware, such as a microcontroller, microprocessor, digital signal processor, or the like. The memory device may be embodied as any type of volatile or non-volatile memory or data storage capable of performing the functions described herein. In operation, the memory device may store various data and software used during operation of the suspension controller 120 such as operating systems, applications, programs, software routines, libraries, and drivers. The data storage device may be embodied as any type of device or devices configured for short-term or long-term storage of data such as, for example, non-transitory, machine-readable media, memory devices and circuits, memory cards, hard disk drives, solid-state drives, non-volatile flash memory, or other data storage devices.

Each IMU 122 may be embodied as an electronic sensor configured to measure and report motion data associated with the vehicle 100, including the specific force/acceleration and angular rate of the vehicle 100, as well as the magnetic field surrounding the vehicle 100 (which may be indicative of global orientation). Each IMU 122 may be embodied as or otherwise include a digital accelerometer, gyroscope, and magnetometer per axis of motion. Each illustrative IMU sensor 122 is embodied as a nine degrees of freedom IMU (e.g., capable of measuring linear acceleration, angular acceleration, and magnetic field in each of three axes). Each of the IMUs 122a through 122d is coupled to the control arm 106 or other suspension member 106, and thus measures and reports motion data associated with the corresponding suspension member 106. The IMU 122e is coupled to the chassis 122 and thus measures and reports motion data associated with the chassis 122 (i.e., independent of motion of the suspension members 106).

The suspension controller 120 and the IMUs 122 may be configured to transmit and/or receive data with each other and/or other devices over the vehicle network 124. The vehicle network 124 may be embodied as any bus, network, or other communication facility used to communicate between devices in the vehicle 100. For example, the vehicle network 124 may be embodied as a controller area network (CAN), universal asynchronous or synchronous receiver-transmitter (UART/USART), radio frequency (RF), a wired or wireless local area network (LAN), and/or a local interconnect network (LIN). In another embodiment the IMUs 122 may include a local processor and transmit non-serial signals commonly known to the art including but not limited to analog or pulse width modulation (PWM).

Although illustrated in FIGS. 1-2 as including four wheels 104, it should be understood that the vehicle 100 may include a different number of wheels 104 and corresponding suspension members 106. Similarly, although illustrated as including air springs 108 for each wheel 104, it should be understood that in some embodiments the vehicle 100 may include air springs 108 for less than all wheels 104. For example, in an embodiment the vehicle 100 may include two air springs 108 for the rear wheels 104 and/or for the front wheels 104.

Figure 3:
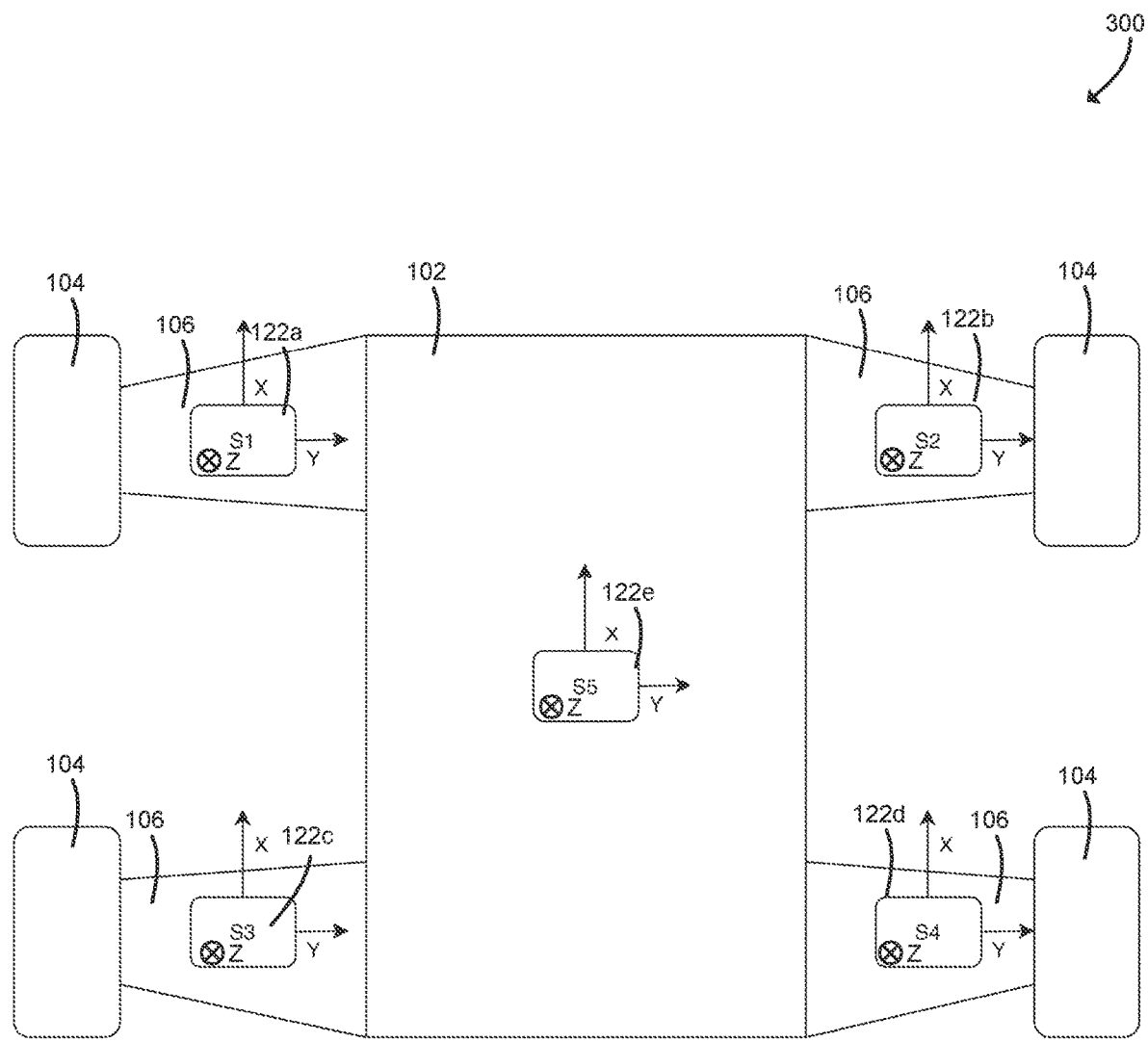
FIG. 3 is a simplified block diagram illustrating sensor measurements that may be generated by the system of FIGS. 1-2.

Referring now to FIG. 3, diagram 300 illustrates sensing configurations for the five ride height sensor IMUs 122a through 122e (labeled S1 through S5 in FIG. 3). As described above, each IMU 122 is a nine-axis IMU, and may measure acceleration, angular rate, and magnetic field strength in each of three axes (X, Y, and Z). Note that the Z axis is illustrated as normal to the page with the positive polarity pointing down for all sensors 122a through 122e. Each of the IMUs 122a through 122d may be coupled to the corresponding suspension member 106 such that rotation of the suspension is an elemental rotation of an axis measured by the IMU 122 (i.e., no off-axis rotation). In addition, in some embodiments, the system may be configured such that the observed rotation is a combination of elemental rotations (off-axis rotation), relative to the IMUs 122. The IMU 122e is coupled to the chassis 102 and thus does not rotate with any suspension member 106.

Each IMU 122 may measure angles about a 3 axis coordinate system as yaw, pitch, and roll. Variables defined for each measurement are shown below in Table 1. During calibration, the primary axis will be identified by exercising the corners and determined based on which axis experienced the largest rotation. Using FIG. 3 as a reference, the primary axis may be assigned as follows: S1$p$=S1$\gamma$, S2$p$=S2$\gamma$, S3$p$=S3$\gamma$, and S4$p$=S4$\gamma$. In other words, the primary axis for each sensor S1 through S4 may be the roll axis ($\gamma$). With the Primary Axis defined, Corner angles C1, C2, C3, C4 for each corner of the vehicle may be defined as shown below in Equations 1 through 4. With those definitions, it is expressed that an increase in C value(s) correlates to an increase in ride height, and vice versa. During calibration, a datum will be defined for the C values. This is done by drooping the suspension to full jounce, then recording each C value and correcting for it as an offset. One potential embodiment of a method for calibration is described below in connection with FIGS. 5-6.

TABLE 1

Variable definitions for sensor measurements.

| Variable | Measurement |
|---|---|
| S1$\alpha$ | Sensor S1 Sensor Yaw |
| S1$\beta$ | Sensor S1 Sensor Pitch |
| S1$\gamma$ | Sensor S1 Sensor Roll |
| S2$\alpha$ | Sensor S2 Sensor Yaw |
| S2$\beta$ | Sensor S2 Sensor Pitch |
| S2$\gamma$ | Sensor S2 Sensor Roll |
| S3$\alpha$ | Sensor S3 Sensor Yaw |
| S3$\beta$ | Sensor S3 Sensor Pitch |

TABLE 1-continued

Variable definitions for sensor measurements.

| Variable | Measurement |
|---|---|
| S3γ | Sensor S3 Sensor Roll |
| S4α | Sensor S4 Sensor Yaw |
| S4β | Sensor S4 Sensor Pitch |
| S4γ | Sensor S4 Sensor Roll |
| S5α | Sensor S5 Sensor Yaw |
| S5β | Sensor S5 Sensor Pitch |
| S5γ | Sensor S5 Sensor Roll |
| S1p | Sensor 1 Primary Axis (Rotation coincident with suspension rotation/motion) |
| S2p | Sensor 2 Primary Axis (Rotation coincident with suspension rotation/motion) |
| S3p | Sensor 3 Primary Axis (Rotation coincident with suspension rotation/motion) |
| S4p | Sensor 4 Primary Axis (Rotation coincident with suspension rotation/motion) |

$$C1 = S5\gamma - S1\gamma \tag{1}$$

$$C2 = S5\gamma + S2\gamma \tag{2}$$

$$C3 = S5\gamma - S5\gamma \tag{3}$$

$$C4 = S5\gamma + S4\gamma \tag{4}$$

The method described above is largely based on Euler Angle and Special Orthogonal SO(3) rotational group representations. In another embodiment, each IMU 122 may measure an angle that is represented and defined as a quaternion. In this manifestation, q1 is the quaternion representation of the IMU sensor output of IMU 1 122a, q2 of IMU 2 122b, q3 of IMU 3 122c, q4 of IMU 4 122d, and q5 of IMU 5 122e. In those embodiments, the corner quaternions may be defined as:

$$C1 = q5 - q1 \tag{5}$$

$$C2 = q5 - q2 \tag{6}$$

$$C3 = q5 - q3 \tag{7}$$

$$C4 = q5 - q4 \tag{8}$$

Figure 4:
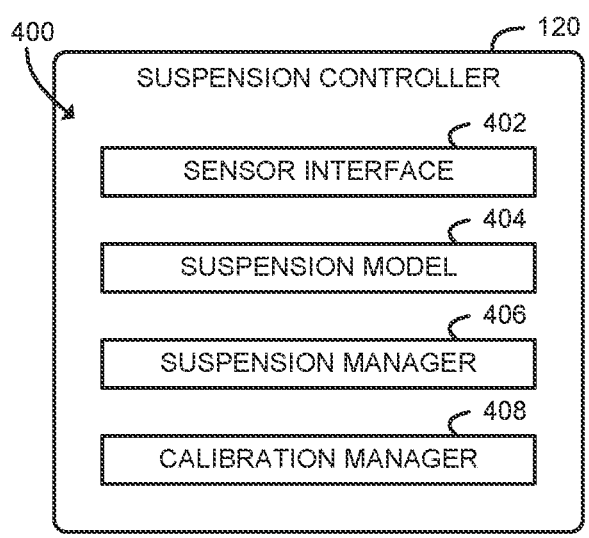
FIG. 4 is a simplified block diagram of at least one embodiment of environment that may be established by the suspension controller of FIGS. 1-2.

Referring now to FIG. 4, in the illustrative embodiment, the suspension controller 120 establishes an environment 400 during operation. The illustrative environment 400 includes a sensor interface 402, a suspension model 404, a suspension manager 406, and a calibration manager 408. The various components of the environment 400 may be embodied as hardware, firmware, software, or a combination thereof. As such, in some embodiments, one or more of the components of the environment 400 may be embodied as circuitry or a collection of electrical devices (e.g., sensor interface circuitry 402, suspension model circuitry 404, suspension manager circuitry 406, and/or calibration manager circuitry 408). It should be appreciated that, in such embodiments, one or more of those components may form a portion of a processor, memory device, data storage device, and/or other components of the suspension controller 120.

The sensor interface 402 is configured to receive motion sensor data from multiple motion sensors 122 attached to the vehicle 100. At least one motion sensor is attached to the chassis 102 of a vehicle, and at least one motion sensor 122 is attached to a suspension member 106 of the vehicle 100 that rotates or pivots relative to the chassis 102 of the vehicle 100. Each motion sensor may comprise an inertial measurement unit (IMU), and the motion sensor data may include accelerometer data, gyroscope data, or magnetometer data. In some embodiments, the sensor interface 402 may be configured to read top of travel values from the motion sensors in response the air suspension being controlled to extend to the top of travel, and to read bottom of travel values from the motion sensors in response to the air suspension being controlled to retract to the bottom of travel.

The suspension model 404 is configured to determine a relative angular position of each suspension member 106 as a function of motion sensor data generated by the motion sensor 122 attached to the suspension member 106 and of motion sensor data generated by the motion sensor 122 attached to the chassis 102.

The suspension manager 406 is configured to adjust an air suspension of the vehicle 100 based on the relative angular position. Adjusting the air suspension may include controlling a ride height of the air suspension. The suspension manager 406 may be further configured to control the air suspension of a vehicle to extend to the top of travel and to retract to the bottom of travel.

The calibration manager 408 is configured to determine a differential travel value as a function of the top of travel value and the bottom of travel value and to scale relative angular position data from the motion sensor based on the differential travel value. The calibration manager 408 may be further configured to identify a most critical axis associated with each motion sensor based on a difference between the top of travel value and the bottom of travel value for each axis. The calibration manager 408 may be configured to determine whether a difference between the top of travel value and the bottom of travel data associated with the motion sensor attached to the chassis 102 exceeds a predetermined acceptable maximum, and, if so, to generate an error in response.

Figure 5:
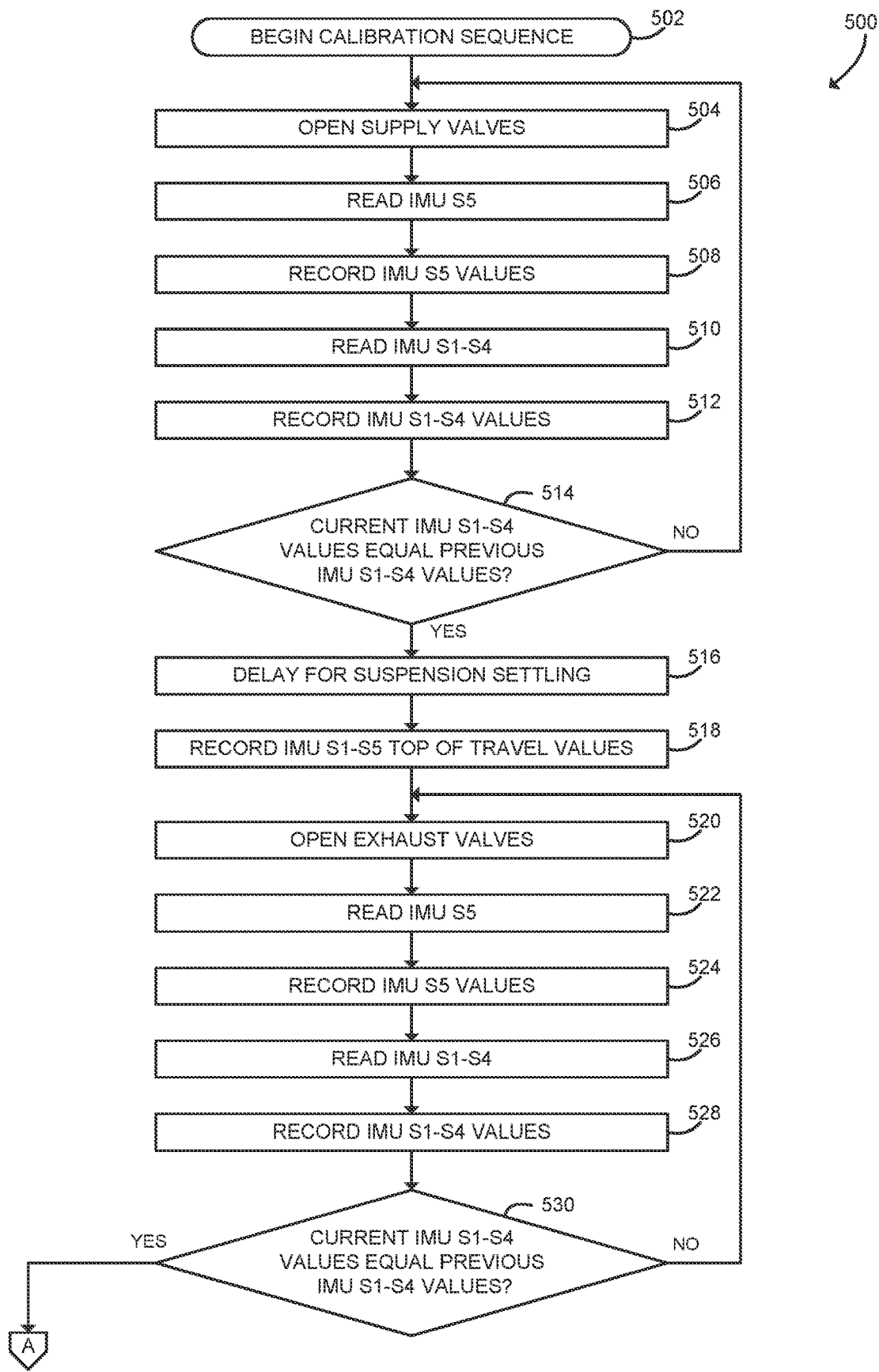
FIGS. 5-6 are a simplified flow diagram of at least one embodiment of a method for calibrating the sensor network that may be executed by the suspension controller of FIGS. 1-2.
Figure 6:
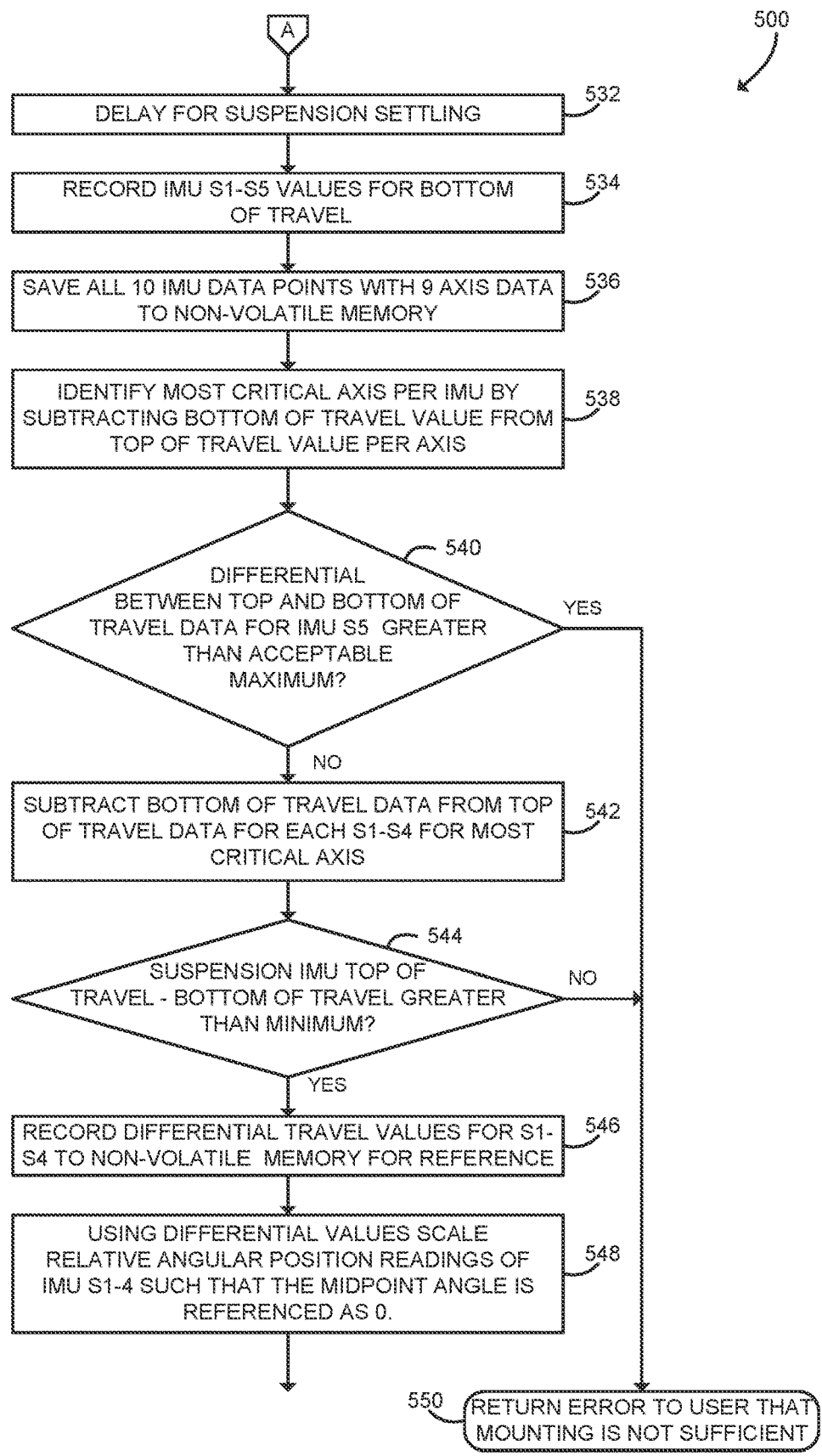

Referring now to FIGS. 5-6, in use, the suspension controller 120 may execute a method 500 for calibrating the sensor network. It should be appreciated that, in some embodiments, the operations of the method 500 may be performed by one or more components of the environment 400 of the suspension controller 120 as shown in FIG. 4. The method 500 begins with block 502, in which the suspension controller 120 begins the calibration sequence. In block 504, the suspension controller 120 opens air supply valves in the valve manifold 110. This begins a process of raising the chassis 102 to its maximum height. This is used to identify the maximum angular value of IMU S1-S4 (IMU 122a to 122d) relative to the datum defined by IMU S5 (IMU 122e). In block 506, the suspension controller 120 reads IMU S5 (IMU 122e), and in block 508 the suspension controller 120 records IMU S5 (IMU 122e) values. In block 510, the suspension controller 120 reads IMUs S1-S4 (IMUs 122a to 122d) and in block 512 the suspension controller 120 records IMU S1-S4 (IMU 122a to 122d) values.

In block 514, the suspension controller 120 determines whether the current IMU S1-S4 (IMU 122a to 122d) values equal previous IMU S1-S4 (IMU 122a to 122d) values. If not, the method 500 loops back to block 504. Thus, the suspension controller 120 continues raising the vehicle suspension until the differential defined by IMUs S1-S4 relative to the datum defined by IMU S5 is no longer changing, indicating the mechanical angular limit of the suspension members and that the vehicle is fully raised. If the current IMU S1-S4 values equal previous IMU S1-S4 values, the method 500 advances to block 516.

In block 516, the suspension controller 120 delays for suspension settling. The suspension controller 120 pauses to allow the angular rates to approach zero and the EKF to stabilize. This allows the accelerometers of the IMUs to be read with high confidence to define the angular position. After the delay, in block 518 the suspension controller 120 records IMU S1-S5 (IMU 122a to IMU 122e) top of travel values. The suspension controller 120 may record all values generated by the IMUs 122, including 3-axis accelerometer data, 3-axis gyroscope data, and 3-axis magnetometer data.

In block 520, the suspension controller 120 opens exhaust valves in the valve manifold 110. This begins a process of lowering the chassis to its minimum height. This is used to identify the minimum angular value of IMU S1-S4 (IMU 122a to 122d) relative to the datum defined by IMU S5 (IMU 122e). In block 522, the suspension controller 120 reads IMU S5 (IMU 122e), and in block 524s the suspension controller 120 records IMU S5 (IMU 122e) values. In block 526, the suspension controller 120 reads IMUs S1-S4 (IMUs 122a to 122d) and in block 528 the suspension controller 120 records IMU S1-S4 (IMU 122a to 122d) values.

In block 530, the suspension controller 120 determines whether the current IMU S1-S4 (IMU 122a to 122d) values equal previous IMU S1-S4 (IMU 122a to 122d) values. If not, the method 500 loops back to block 520. Thus, the suspension controller 120 continues lowering the vehicle suspension until the differential defined by IMUs S1-S4 relative to the datum defined by IMU S5 is no longer changing, indicating the mechanical angular limit of the suspension members and the vehicle is at its lowest height. If the current IMU S1-S4 values equal previous IMU S1-S4 values, the method 500 advances to block 532, shown in FIG. 6.

As shown in FIG. 6, in block 532, the suspension controller 120 delays for suspension settling. The suspension controller 120 pauses to allow the angular rates to approach zero and the EKF to stabilize. This allows the accelerometers of the IMUs to be read with high confidence to define the angular position. After the delay, in block 534 the suspension controller 120 records IMU S1-S5 (IMU 122a to IMU 122e) bottom of travel values. The suspension controller 120 may record all values generated by the IMUs 122, including 3-axis accelerometer data, 3-axis gyroscope data, and 3-axis magnetometer data.

In block 536, the suspension controller 120 saves all ten IMU data points with 9 axis data to non-volatile memory. In particular, the suspension controller 120 may save the 3-axis accelerometer data, 3-axis gyroscope data, and 3-axis magnetometer data for each of the IMUS 122a through 122e for both top of travel (as described above in connection with block 518) and bottom of travel (as described above in connection with block 534).

In block 538, the suspension controller 538 identifies a most critical axis per IMU 122 by subtracting the bottom of travel value from the top of travel value per axis. The critical angular axis is to be defined as the axis direction with the largest differential between top and bottom of travel.

In block 540, the suspension controller 120 determines whether the differential between the top and bottom of travel data for IMU S5 (IMU 122e) is greater than a predetermined acceptable maximum. The reference datum defined by chassis 102 sensor IMU S5 (IMU 122e) must be stable throughout suspension travel. If the Chassis IMU 122e is not stable enough, notify user and abort calibration. Thus, if the differential is greater than the acceptable maximum, the method 500 branches to block 550, in which the suspension controller returns an error to the user that mounting of the IMUs 122 is not sufficient. Referring back to block 540, if the differential is not greater than the acceptable maximum, the method 500 advances to block 542.

In block 542, the suspension controller 120 subtracts bottom of travel data from top of travel data for each IMU S1-S4 (IMUs 122a to 122d) for the most critical axis. Thus, the suspension controller 120, using the most critical axis, identifies total angular span for each suspension mounted IMU 122. In block 544, the suspension controller 120 determines whether each suspension IMU 122 top of travel minus bottom of travel is greater than a predetermined minimum. The suspension controller 120 thus determines if angular range is greater than a minimum range to provide adequate resolution for system functions. If the top of travel minus bottom of travel is not greater than the minimum, the method 500 branches to block 550, in which the suspension controller returns an error to the user that mounting of the IMUs 122 is not sufficient. Referring back to block 544, if the top of travel minus bottom of travel is greater than the minimum, the method 500 advances to block 546.

Figure 7:
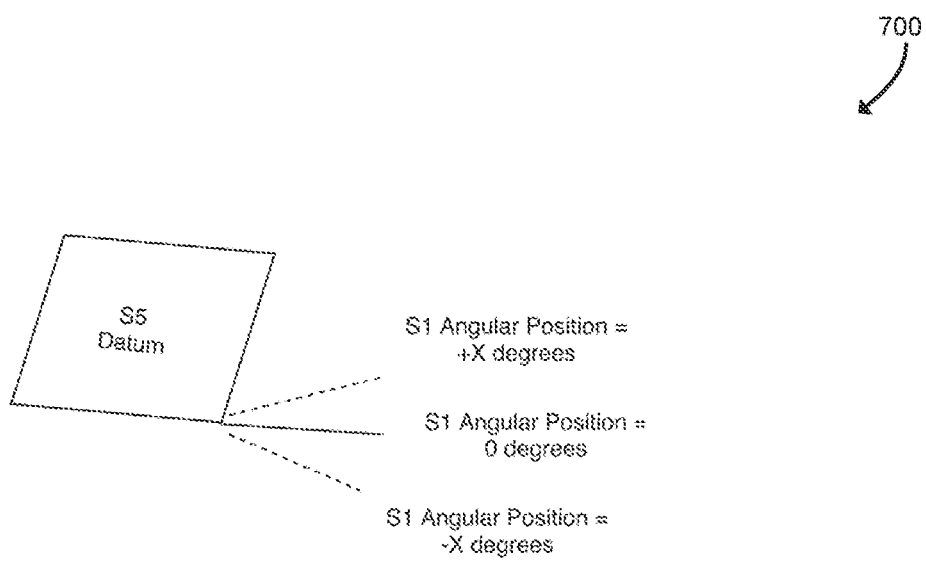
FIG. 7 is a schematic diagram illustrating scaled measurements that may be made by the suspension controller of FIGS. 1-2.

In block 546, the suspension controller 120 records differential travel values for IMUs S1-S4 (IMUs 122a to 122d) to non-volatile memory for reference. In block 548, the suspension controller 120 uses the differential values to scale relative angular position readings of IMUs S1-S4 (IMUs 122a to 122d) such that the midpoint angle for each IMU is referenced as zero. This sets the midpoint of travel to zero degrees for all suspension members S1-S4. All angular measurements will use the sign of the differential to determine how the suspension components will be adjusted. Referring to FIG. 7, diagram 700 illustrates scaled angle measurements for IMU S1 relative to a datum established by IMU S5. After scaling the relative angular position readings, the method 500 is completed. The suspension controller 120 may next perform dynamic suspension adjustment as shown in FIGS. 8-9 and described below.

Figure 8:
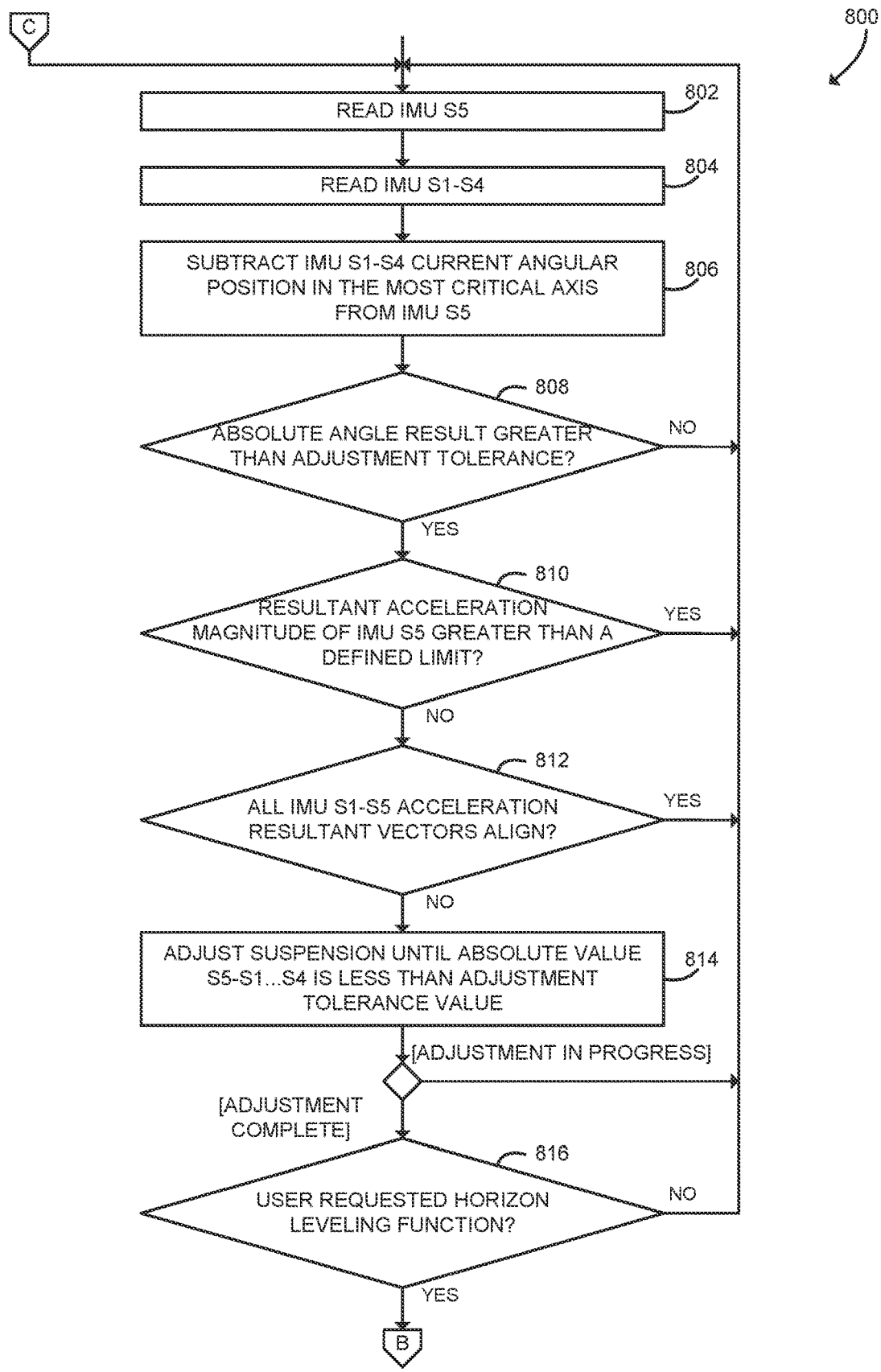
FIGS. 8-9 are a simplified flow diagram of at least one embodiment of a method for dynamic suspension adjustment that may be executed by the suspension controller of FIGS. 1-2.
Figure 9:
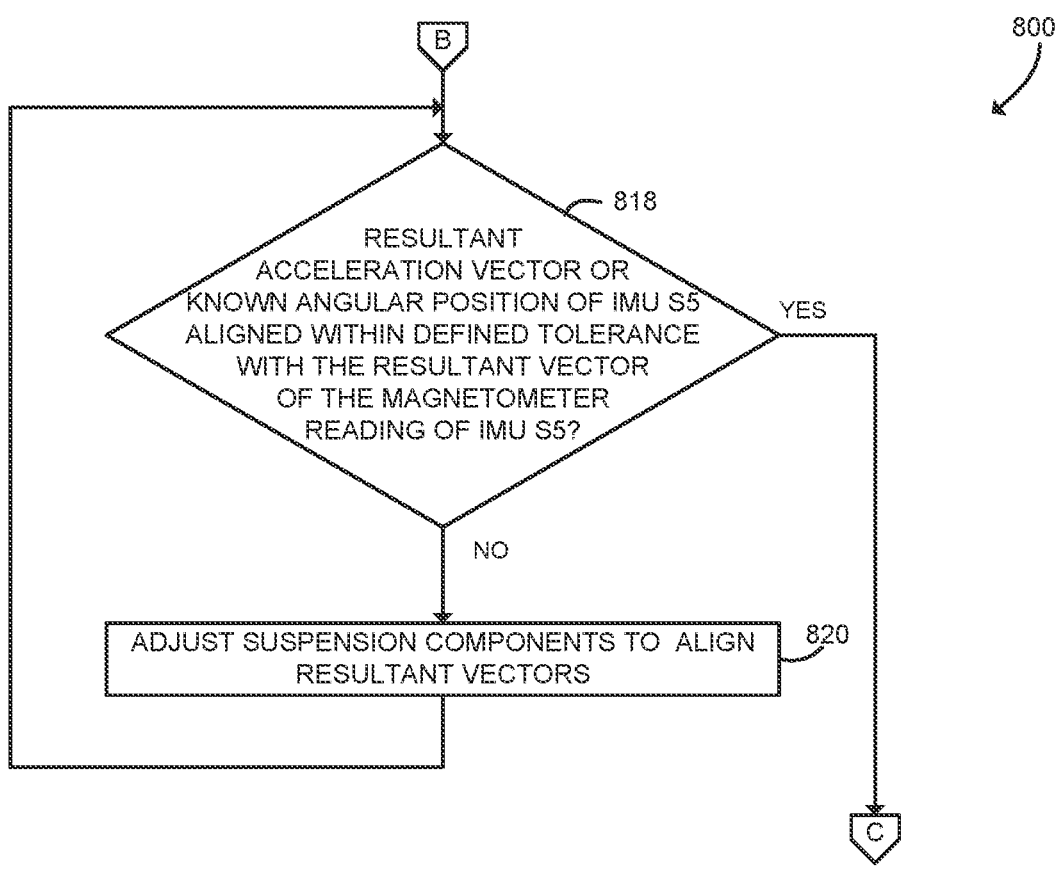

Referring now to FIGS. 8-9, in use, the suspension controller 120 may execute a method 800 for dynamic suspension adjustment. These would be adjustments made while the vehicle is moving. It should be appreciated that, in some embodiments, the operations of the method 800 may be performed by one or more components of the environment 400 of the suspension controller as shown in FIG. 4. The method 800 begins with block 802, in which the suspension controller 120 reads IMU S5 (IMU 122e). In block 804, the suspension controller 120 reads IMUs S1-S4 (IMU 122a to 122d).

The suspension controller 120 may read any combination of values from the accelerometer, gyroscope, magnetometer, or other motion sensors of the IMUs 122 to determine angular position. In some embodiments, the suspension controller 120 may use sensor values with a higher expected accuracy or other confidence measure to determine angular position. For example, the suspension controller 120 may determine whether the vehicle 100 is in a highly dynamic environment, for example an environment with high magnitude acceleration values. If not in a highly dynamic environment, the suspension controller 120 may use accelerometer data to determine angular position. If in a dynamic environment, the suspension controller 120 may determine change in angle from gyroscope data and integrate to find angular position. In some embodiments, the suspension controller 120 may perform Kalman filtering, through linear Kalman Filtering or Extended Kalman Filtering, as well as complimentary and or particle filtering to determine whether to use accelerometer or gyroscope data. The suspension controller 120 may create a state space model and then feed in measurement data from both the accelerometer and the gyroscope data. The suspension controller 120 may predict the state using the state space model, perform a measurement, determine an error, and predict the next state. During such time periods, the suspension controller 120 may change a confidence level for sensor reading. The sensor readings may be weighted based on confidence, and a composite of the weighted values may be used as the sensor value. In some embodiments, the suspension controller 120 may filter out or otherwise reject signals with certain frequencies, such as frequencies associated with the noise floor of the IMUs 122, frequencies associated with wheel hop, or other frequencies related to sources of noise.

In block 806, the suspension controller 120 subtracts IMU S1-S4 current angular position value in the most critical axis from the IMU S5 value. The chassis IMU S5 (IMU 122e) defines the datum of the vehicle body. All suspension IMUs S1-S4 (IMUs 122a to 122d) are providing angular positions to be used as relative to the S5 defined datum.

In block 808, the suspension controller 120 determines whether the absolute angle result is greater than a predetermined adjustment tolerance. Thus, the suspension controller 120 determines if an adjustment needs to be made. In this embodiment this could be for 1-4 suspension members, known as S1-S4. If the absolute angle result is not greater than the adjustment tolerance, the method 800 loops back to block 802 to continue reading the IMUs 122. If the absolute angle result is greater than the adjustment tolerance, the method 800 advances to block 810.

In block 810, the suspension controller 120 determines if the resultant acceleration magnitude of IMU S5 (IMU 122e) is greater than a defined limit. Thus, the suspension controller 120 utilizes the chassis IMU S5 to determine if the vehicle 100 is in a highly dynamic situation. If so, the suspension controller 120 does not adjust the suspension. Thus, if the acceleration magnitude is greater than the defined limit, the method 800 loops back to block 802 to continue reading the IMUs 122. If not, the method 800 advances to block 812.

In block 812, the suspension controller 120 determines whether all IMU S1-S5 (IMU 122a to 122e) acceleration resultant vectors align. By comparing the resultant acceleration vectors it can be determined if the vehicle 100 is in a situation that is experiencing common acceleration. This could include but is not limited to: turning, accelerating, decelerating, traversing a slope laterally, longitudinally, or a composite of both. If the acceleration resultant vectors align, the method 800 loops back to block 802 to continue reading the IMUs 122. If not, the method 800 advances to block 814.

In block 814, the suspension controller 120 adjust the suspension until the absolute values of S5-S1, S5-S2, S5-S3, and S5-S4 is less than the adjustment tolerance value. The suspension may be adjusted using various methods until relative angle of suspension components are within range. A positive differential when subtracting indicates the suspension member is drooping relative to the datum and suspension components would lower the datum. A negative differential value would indicate the datum is lower than targeted and the suspension components would adjust to increase the relative height of the datum. While the adjustment is in progress, the method 800 loops back to block 802 to continue reading the IMUs 122. When the adjustment is complete, the method 800 advances to block 816.

In block 816, the suspension controller 120 determines whether the user has requested a horizon leveling function. If not, the method 800 loops back to block 802 to continue reading the IMUs 122. If the user has requested horizon leveling, the method 800 advances to block 818, shown in FIG. 9.

Referring now to FIG. 9, in block 818 the suspension controller 120 determines whether the resultant acceleration vector or known angular position of IMU S5 is aligned within defined tolerance with the resultant vector of the magnetometer reading of IMU S5. If the resultant acceleration vector or known angular position is aligned, the method 800 loops back to block 802 shown in FIG. 8 to continue reading the IMUs 122. If the resultant acceleration vector or known angular position is not aligned, the method 800 advances to block 820.

In block 820, the suspension controller 120 adjusts suspension components to align the resultant vectors. Using the datum defined by IMU S5, the suspension controller 120 may adjust the suspension components using known methods to align a vector normal to the plane with the gravity vector, which can be determined using a composite of the magnetometer reading referencing Earth's magnetic field and the accelerometer values in the Z axis. The magnetometer reading associated with gravity must align with a single axis accelerometer reading of IMU S5; this would indicate that the datum defined by IMU S5 is, within tolerance, perpendicular to gravity. The method 800 loops back to block 818 to continue leveling the suspension.

The embodiment(s) detailed hereinabove may be combined in full or in part, with any alternative embodiment(s) described. A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the present disclosure describes various exemplary embodiments, the disclosure is not so limited. To the contrary, the disclosure is intended to cover various modifications, uses, adaptations, and equivalent arrangements based on the principles disclosed. Further, this disclosure is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims.

The invention claimed is:

1. A suspension controller for calibrating a vehicle air suspension, the suspension controller comprising: a suspension manager configured to (i) control an air suspension of a vehicle to extend to a top of travel and (ii) control the air suspension to retract to a bottom of travel; a sensor interface to (i) read a top of travel value from a first motion sensor coupled to a suspension member of the vehicle in response to control of the air suspension to extend to the top of travel, wherein the suspension member pivots relative to a chassis of the vehicle, and (ii) read a bottom of travel value from the first motion sensor in response to control of the air suspension to retract to the bottom of travel; and a calibration manager to (i) determine a differential travel value as a function of the top of travel value and the bottom of travel value, and (ii) scale relative angular position data from the first motion sensor based on the differential travel value.

2. The suspension controller of claim 1, wherein the calibration manager is further to identify a most critical axis associated with the first motion sensor based on a difference between the top of travel value and the bottom of travel value for each axis.

3. The suspension controller of claim 1, wherein: the sensor interface is further to (i) read a second top of travel value from a second motion sensor coupled to the chassis of the vehicle in response to the control of the air suspension to extend to the top of travel, and (ii) read a second bottom of travel value from the second motion sensor in response to the control of the air suspension to retract to the bottom of travel; and the calibration manager is further to (i) determine whether a difference between the second top of travel value and the second bottom of travel data exceeds a predetermined acceptable maximum, and (ii) generate an error in response to a determination that the difference exceeds the acceptable maximum.

4. A method for controlling a vehicle air suspension, the method comprising: receiving, by a suspension controller, first motion sensor data from a first motion sensor, wherein the first motion sensor is attached to a chassis of a vehicle; receiving, by the suspension controller, second motion sensor data from a second motion sensor, wherein the second motion sensor is attached to a suspension member of the vehicle, wherein the suspension member pivots relative to the chassis of the vehicle; determining, by the suspension controller, a relative angular position of the suspension member as a function of the first motion sensor data and the second motion sensor data; and adjusting, by the suspension controller, an air suspension of the vehicle based on the relative angular position.

5. The method of claim 4, wherein each of the first motion sensor and the second motion sensor comprises an inertial measurement unit (IMU), and wherein each of the first motion sensor data comprises accelerometer data, gyroscope data, or magnetometer data.

6. The method of claim 4, further comprising receiving motion sensor data from a third motion sensor, a fourth motion sensor, and a fifth motion sensor, wherein each of the second motion sensor, the third motion sensor, the fourth motion sensor, and the fifth motion sensor are each attached to a different suspension member of the vehicle.

7. The method of claim 4, wherein adjusting the air suspension comprises controlling a ride height of the air suspension.

8. A method for calibrating a vehicle air suspension, the method comprising: controlling, by a suspension controller, an air suspension of a vehicle to extend to a top of travel; reading, by the suspension controller, a top of travel value from a first motion sensor coupled to a suspension member of the vehicle in response to controlling the air suspension to extend to the top of travel, wherein the suspension member pivots relative to a chassis of the vehicle; controlling, by the suspension controller, the air suspension to retract to a bottom of travel; reading, by the suspension controller, a bottom of travel value from the first motion sensor in response to controlling the air suspension to retract to the bottom of travel; determining, by the suspension controller, a differential travel value as a function of the top of travel value and the bottom of travel value; and scaling, by the suspension controller, relative angular position data from the first motion sensor based on the differential travel value.

9. The method of claim 8, further comprising identifying a most critical axis associated with the first motion sensor based on a difference between the top of travel value and the bottom of travel value for each axis.

10. The method of claim 8, further comprising: reading, by the suspension controller, a second top of travel value from a second motion sensor coupled to the chassis of the vehicle in response to controlling the air suspension to extend to the top of travel; reading, by the suspension controller, a second bottom of travel value from the second motion sensor in response to controlling the air suspension to retract to the bottom of travel; determining, by the suspension controller, whether a difference between the second top of travel value and the second bottom of travel data exceeds a predetermined acceptable maximum; and generating, by the suspension controller, an error in response to determining that the difference exceeds the acceptable maximum.

11. One or more non-transitory computer-readable storage media that, in response to being executed by a computing device, cause the computing device to perform the method of claim 8.

12. A computing device comprising means for performing the method of claim 8.

* * * * *